United States Patent
Wallrabe et al.

(10) Patent No.: US 10,183,572 B2
(45) Date of Patent: Jan. 22, 2019

(54) FRONT END ARRANGEMENT OF A MOTOR VEHICLE

(71) Applicant: Dr. Ing. h.c. F. Porsche Aktiengesellschaft, Stuttgart (DE)

(72) Inventors: Sven Wallrabe, Leonberg (DE); Markus Keller, Leonberg (DE); Robert Bona, Sindelfingen (DE); Niklas Neuschwanger, Schwieberdingen (DE); Peter Reutlinger, Knittlingen (DE); Daniel Quednau, Karlsruhe (DE); Andreas Burk, Dautphetal (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 15/822,373

(22) Filed: Nov. 27, 2017

(65) Prior Publication Data
US 2018/0154762 A1   Jun. 7, 2018

(30) Foreign Application Priority Data
Dec. 1, 2016 (DE) .......... 10 2016 123 216

(51) Int. Cl.
*B60K 11/04*  (2006.01)
(52) U.S. Cl.
CPC .................... *B60K 11/04* (2013.01)
(58) Field of Classification Search
CPC .......... B60K 11/04; B60K 11/02; B60K 11/08
USPC ............................... 180/68.4, 68.6
See application file for complete search history.

(56) References Cited

U.S. PATENT DOCUMENTS

| 6,622,808 B2 * | 9/2003 | Sasano ............... B29C 45/1676 |
| | | 180/68.3 |
| 8,371,407 B2 * | 2/2013 | Hassdenteufel ..... B62D 25/084 |
| | | 165/149 |
| 2006/0213640 A1 | 9/2006 | Matsuoka et al. |
| 2009/0039674 A1 | 2/2009 | Hassdenteufel et al. |
| 2013/0069394 A1 | 3/2013 | Homan |
| 2015/0107931 A1 | 4/2015 | Schmid et al. |

FOREIGN PATENT DOCUMENTS

| DE | 101 17 278 | 12/2001 |
| DE | 10 2007 033 116 | 1/2009 |
| DE | 10 2009 027 475 | 9/2010 |
| DE | 10 2013 111 615 | 4/2015 |
| DE | 10 2014 100 795 | 5/2015 |

OTHER PUBLICATIONS

Mechanical translation of DE102009027475. (Year: 2010).*
German Search Report dated Sep. 12, 2017.

* cited by examiner

*Primary Examiner* — John D Walters
(74) *Attorney, Agent, or Firm* — Gerald E. Hespos; Michael J. Porco; Matthew T. Hespos

(57) ABSTRACT

A front end arrangement of a motor vehicle has a front end module (4) that is fastened directly or indirectly to vehicle longitudinal carriers of a vehicle body arrangement which delimit an engine compartment (10). At least one cooling apparatus (12) is mounted in a floating manner on that side of the front end module (4) that is directed toward the engine compartment (10). At least one air guide duct is fastened to the front end module (4) and is provided with at least one air guide arrangement (18). The air guide arrangement (18) is connected via fastening means (19) to the cooling apparatus (12).

5 Claims, 2 Drawing Sheets

FRONT END ARRANGEMENT OF A MOTOR VEHICLE

CROSS REFERENCE TO RELATED APPLICATION

This application claims priority under 35 USC 119 to German Patent Appl. No. 10 2016 123 216.5 filed on Dec. 1, 2016, the entire disclosure of which is incorporated herein by reference.

BACKGROUND

Field of the Invention

The invention relates to a front end arrangement of a motor vehicle having a front end module that is fastened directly or indirectly to vehicle longitudinal carriers of a vehicle body arrangement to delimit an engine compartment. At least one cooling apparatus is mounted in a floating manner on the side of the front end module that is directed toward the engine compartment. At least one air guide duct is fastened to the front end module and has at least one air guide arrangement.

Description of the Related Art

Front end arrangements of the type described above are well known in the prior art. For instance, DE 10 2014 100 795 A1 discloses a front end arrangement having a front end module, as shown in FIG. 2 of that document. A cooling apparatus is mounted in a floating manner on the side of the front end module directed toward the engine compartment. Mounting of the cooling apparatus in a floating manner is required in the case of intercoolers due to the high vibration behavior. In addition, a satisfactory flow of external air onto the intercooler for the cooling system is extremely important in the case of turbocharged engines. Efficient air routing is problematic in view of a constantly decreasing amount of available installation space in the engine compartment. For instance, DE 10 2014 100 795 A1 configures a crossmember for the protection of pedestrians as an air guide element. Moreover, DE 10 2013 111 615 A1 provides an air guide element for a cooling apparatus where the air guide element is fastened at least in part regions to a foam crash element of a front end module. A front end arrangement of this type also does not ensure an optimum flow of external air onto the cooling apparatus.

It is therefore an object of the invention to provide a simple and inexpensive front end arrangement that ensures an optimum flow of external air onto the at least one cooling apparatus.

SUMMARY

The invention relates to an air guide arrangement that is connected via fastening means to the cooling apparatus. The fastening of the air guide arrangement to the cooling apparatus ensures that the external air is routed in an optimum way to the cooling apparatus and is not routed outside the cooling apparatus.

The fastening means may be a clip to ensure simple and inexpensive mounting. Thus, the air guide arrangement may be dismantled without being destroyed in the case of repairs.

The air guide arrangement may be configured as first and second longitudinal parts. The first longitudinal part is directed toward the front end module and has a high strength. The second longitudinal part is directed toward the cooling apparatus and has a high elasticity. This ensures an air guide face in the region of the impinging external air. The air guide face has a high stiffness and strength and therefore ensures reliable and low-noise air routing. A reliable, fluid-tight seat of the air guide arrangement is ensured in the region of the cooling apparatus by virtue of the fact that the second longitudinal part is produced from a material with a high elasticity. As a result, an absence of air in the region of the cooling apparatus can be avoided.

The first longitudinal part may be produced from a thermoplastic, and the second longitudinal part may be produced from an elastomer.

The air guide arrangement can be produced using the injection molding process to obtain a single-piece air guide arrangement.

For the case where at least two cooling apparatuses are provided, for example a main water cooler and two intercoolers, an air guide arrangement may provided for a plurality of cooling apparatuses.

DETAILED DESCRIPTION

Figure 1:
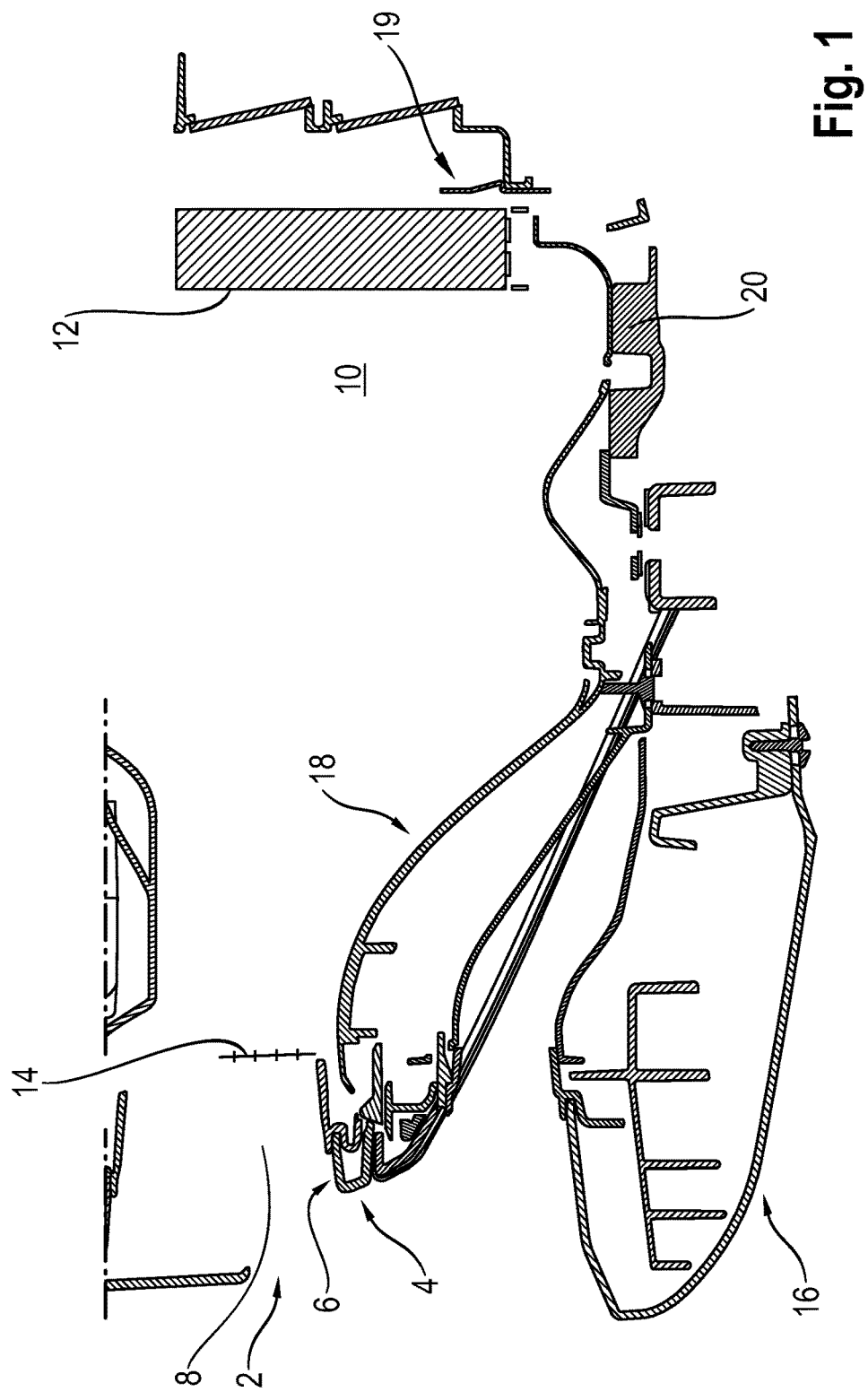
FIG. 1 shows a diagrammatic sectional view in the region of a cooling apparatus of a front end arrangement according to the invention.

FIG. 1 is a diagrammatic sectional view of a front end arrangement 2 of a motor vehicle (not shown in further detail) having a front end module 4 that is fastened to vehicle longitudinal carriers (not shown in further detail) of a vehicle body arrangement. The front end module 4 has a bumper crossmember 6 with an arrangement for protecting pedestrians (not shown in further detail). The bumper crossmember 6 delimits the lower side of an air guide duct 8 that routes external air to a cooling apparatus 12 in the engine compartment 10. The air guide duct 8 has a ventilation grille 14 that routes the external air in a regulated manner to the cooling apparatus 12, which is a main water cooler in the present embodiment. Furthermore, FIG. 1 diagrammatically shows a lower spoiler element 16 of the front end arrangement 2.

An air guide arrangement 18 is fastened on one side releasably to the front end module 4 of the front end arrangement 2 and is fastened on the other side releasably via a clip fastening 19 (see FIG. 2) to the cooling apparatus 12 that is mounted in a floating manner. In addition, the air guide arrangement 18 is supported on an undertray element 20 of the vehicle body arrangement. By way of the air guide arrangement 18, which can be produced and assembled simply and inexpensively, external air is guided in an optimum way onto the relevant cooling apparatus 12. A loss of external air (absence of air) is avoided by the fastening and the associated sealing of the air guide arrangement 18 on the cooling apparatus 12.

Figure 2:
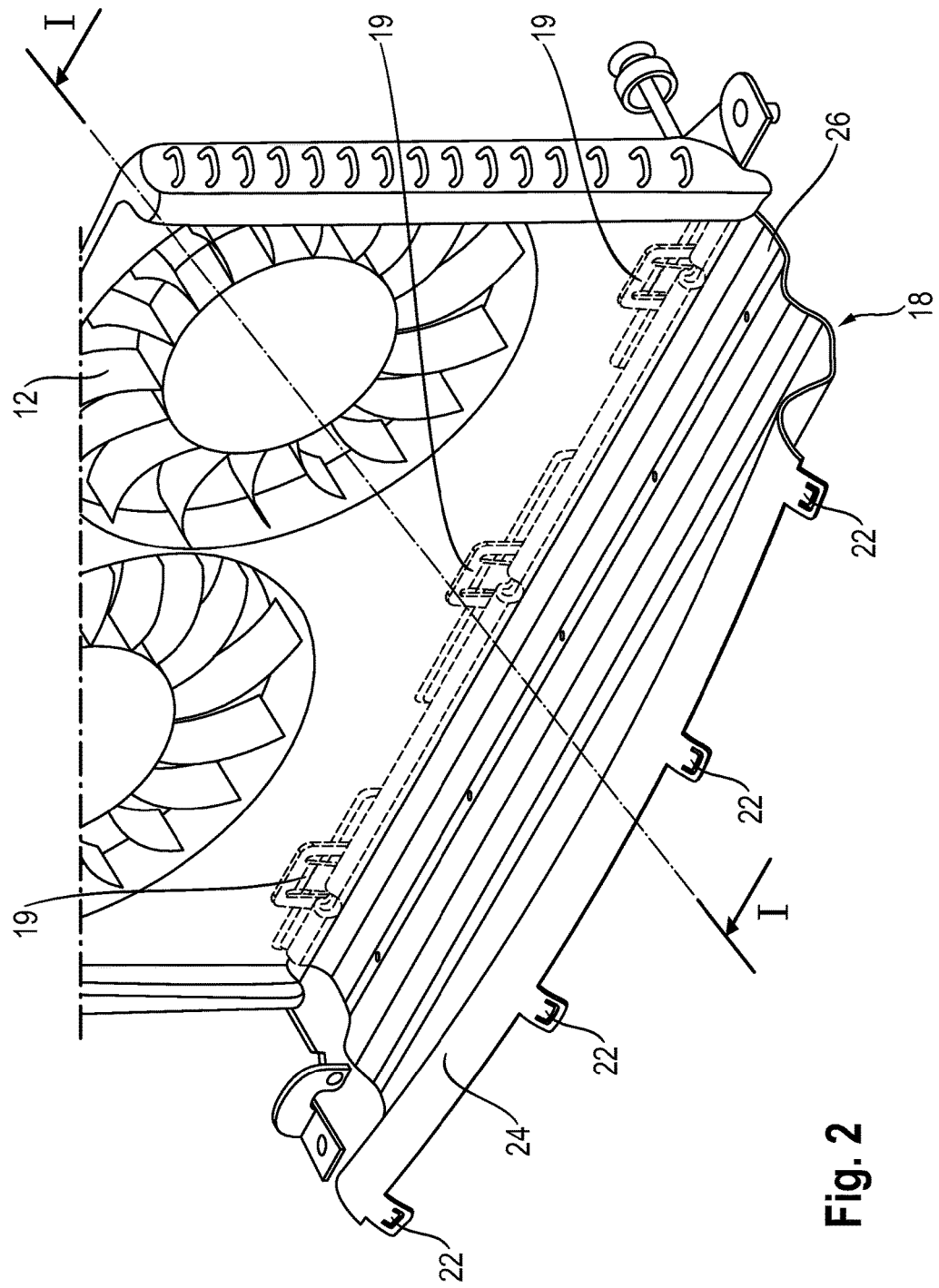
FIG. 2 shows a perspective view of an air guide arrangement.

FIG. 2 is a perspective view of the air guide arrangement 18 that is fastened via the clip connection 19 to the cooling apparatus 12. Latches 22 hook the air guide arrangement 18 into the front end module 6.

The air guide arrangement 18 is configured in two pieces, namely, first and second longitudinal parts 24 and 26. The first longitudinal part 24 is directed toward the front end module 6 and is produced from a thermoplastic that has a high strength and is therefore not deformed by the inflowing external air even at high speed. The second longitudinal part 26 is directed toward the cooling apparatus 12 and is produced from an elastomer and therefore has a high elasticity. As a result, the second longitudinal part adjoins the cooling apparatus 12 in a simple way to ensure a fluid-tight seal of the air guide arrangement 18.

The air guide arrangement 18 is produced using the injection molding process. However, it should be clear that other production processes are possible. The air guide arrangement 18 can also be produced from two individual parts that are in turn connected to one another releasably or non-releasably.

What is claimed is:

1. A front end arrangement for a motor vehicle body arrangement, comprising:
    a front end module fastened to vehicle longitudinal carriers of the vehicle body arrangement;
    at least one air guide duct formed above the front end module and extending rearward;
    at least one cooling apparatus mounted in a floating manner and spaced rearward of the front end module; and
    at least one air guide arrangement extending along a path of the at least one air guide duct between the front end module and the at least one cooling apparatus and defining a bottom surface of the at least one air guide duct, the at least one air guide arrangement having opposed forward and rearward ends, the forward end fastened to the front end module and the rearward end fastened to the cooling, apparatus via fastening means.

2. The front end arrangement of claim 1, wherein the fastening means are configured as releasable fastening means.

3. The front end arrangement of claim 1, wherein the air guide arrangement comprises a first longitudinal part that is directed toward the front end module and is formed from a thermoplastic, and a second longitudinal part that is directed toward the cooling apparatus and is formed from an elastomer.

4. The front end arrangement of claim 3, wherein the air guide arrangement is produced using the injection molding process.

5. The front end arrangement of claim 1, wherein the at least one cooling apparatus comprises at least two cooling apparatuses.

\* \* \* \* \*